3,080,929
CULTIVATOR FOR USE ON A FOUR-WHEEL TRACTOR
Frank C. Holmes, Trumbull, Conn., assignor, by mesne assignments, to Beaver Industries, Incorporated, New Hartford. Conn., a corporation of Connecticut
Filed Oct. 8, 1959, Ser. No. 845,154
6 Claims. (Cl. 172—99)

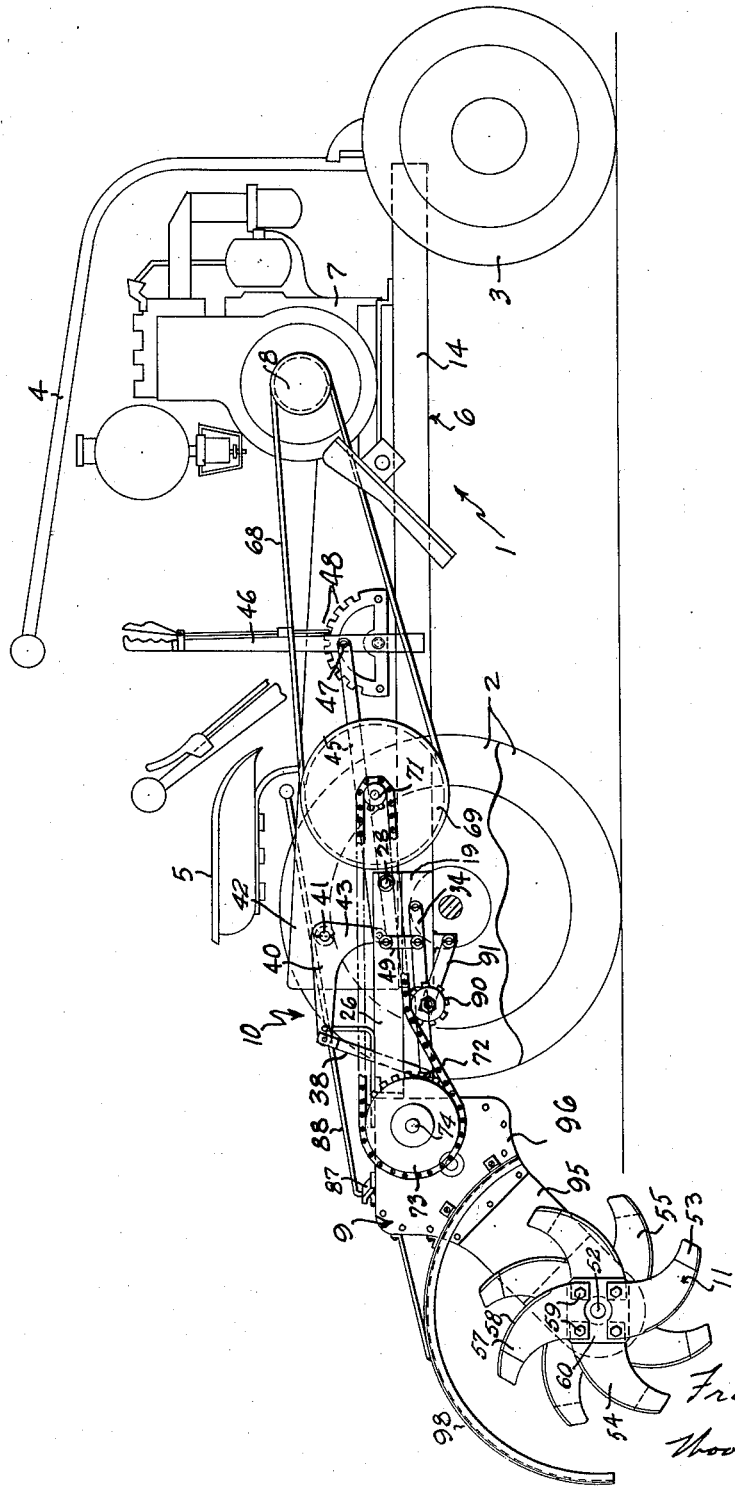

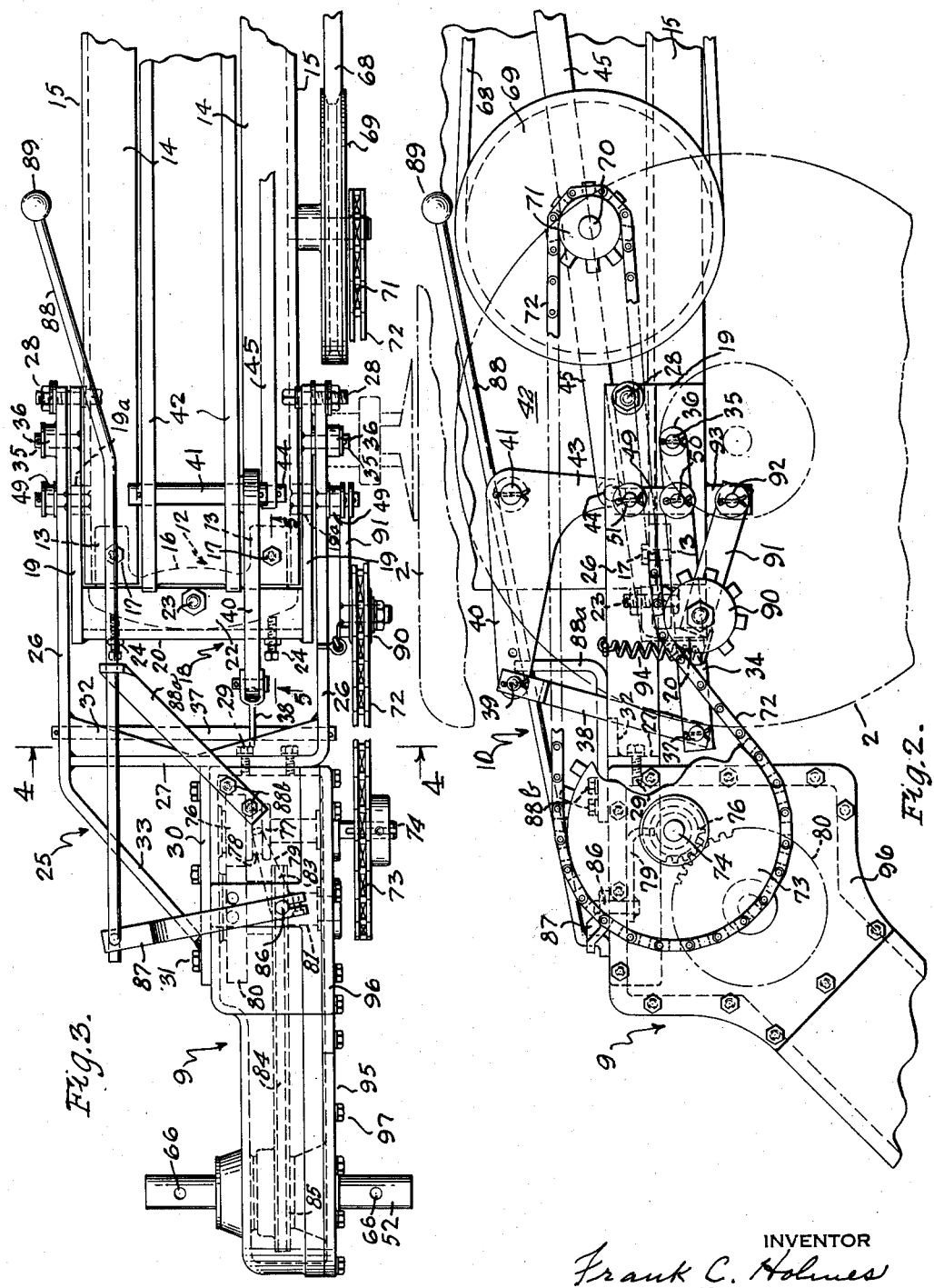

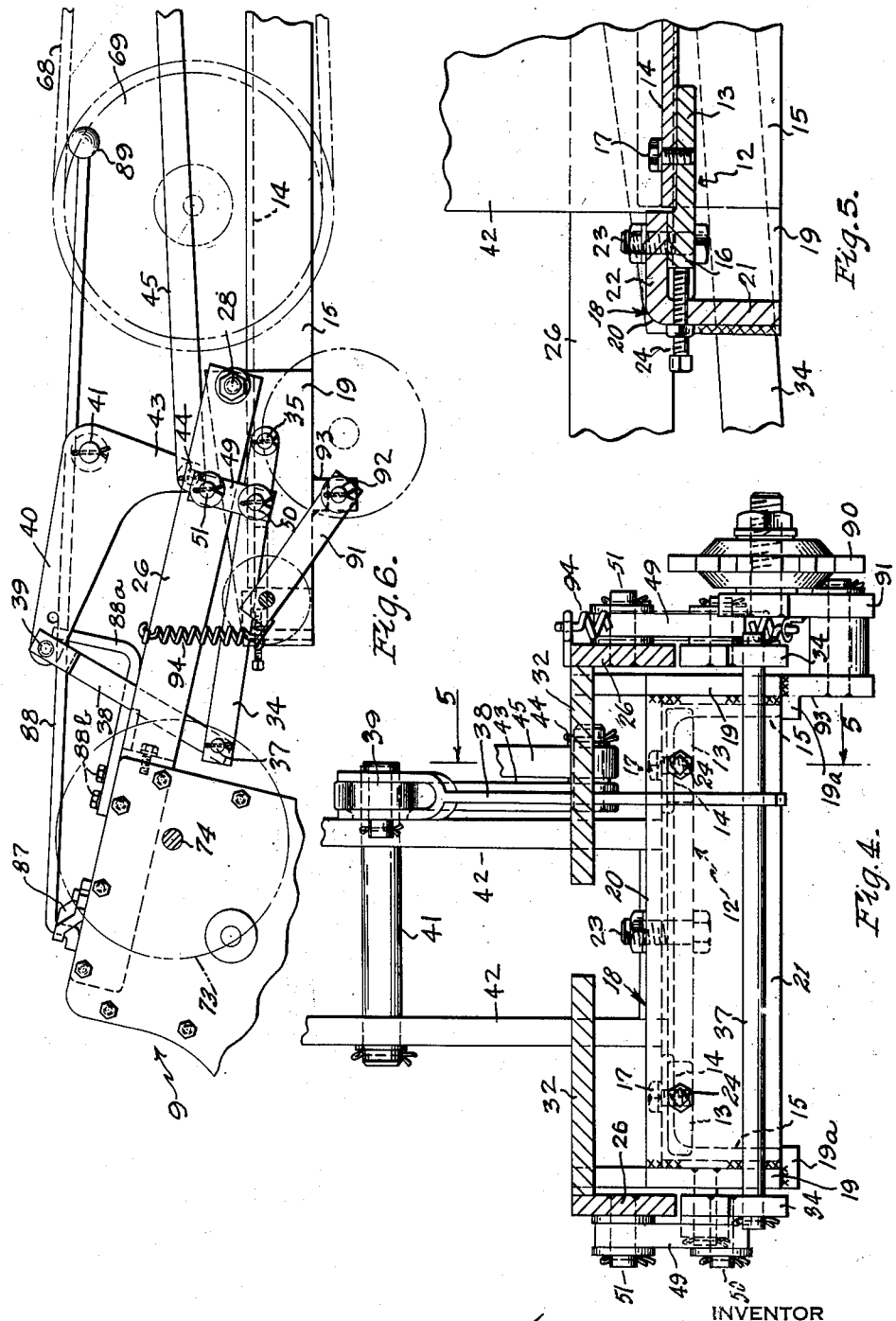

This invention relates to a cultivator attachment for use with a wheeled tractor, such, for example, as the four-wheel type, and has for an object to provide a cultivator unit which may be readily attached to or detached from the tractor, permitting use of the tractor for other purposes.

Another object is to provide a support or attaching means for securing the unit to the tractor, comprising a single bolt hitch plus adjusting screws for lining up the unit in proper relation to the center line of the tractor, which arrangement provides a very easy attaching feature and one minimizing the time necessary for properly mounting the unit on a tractor.

Another object is to provide an improved control means for shifting the cultivator between a lower operating position and an upper inoperative position, the latter for transporting between different locations.

A further object is to provide improved mounting means for the cultivator blades whereby they may be readily changed, and also to provide an improved driving means from the tractor motor to the cultivator blades.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

FIG. 1 is a side elevation showing this cultivator unit applied to a tractor, the near side rear wheel of the tractor being broken away to more clearly show the construction;

FIG. 2 is a side view of the means for mounting the unit on the tractor and also portions of the drive means for the cultivator blades;

FIG. 3 is a top plan view thereof;

FIG. 4 is a transverse section substantially on line 4—4 of FIG. 3;

FIG. 5 is a detail section through the means for securing the unit to the tractor frame, taken substantially on line 5—5 of FIGS. 3 and 4; and FIG. 6 is a side view of a portion of the linkage for raising and lowering the cultivator blades, the linkage elements being shown in the raised position.

The tractor 1 is of the four-wheel type comprising the rear wheels 2 and front wheels 3, with suitable steering mechanism comprising the handle or hand lever 4 in suitable operative relation to the seat 5 for the operator. The tractor includes a frame 6 on which is mounted any suitable type of motor 7 provided with a power take-off pulley 8, in this case a grooved pulley. This frame includes side members 15 in the form of angle bars and upright heavy plate members 42.

This cultivator unit or attachment comprises a housing 9 which is secured to the rear end of the tractor by suitable linkage indicated as a whole by the numeral 10, by means of which the cultivator blades 11 may be raised from or lowered to the operating position. This housing 9 is mounted on the linkage 10 by the means shown in FIGS. 1–6 inclusive. This linkage is a double linkage so that the cultivator unit is supported on the frame of the tractor on opposite sides thereof, thus giving a uniform lifting action, which would not be true if a single linkage on one side only of the frame were used. This linkage comprises a supporting bracket 12 in the form of a block or heavy plate including spaced side arms or lugs 13 extending under the top horizontal flanges 14 of side angle members 15 of the frame of the tractor, these arms being connected by a transverse member 16 and rigidly connected to the flanges 14 by any suitable means, such as the cap screws 17. Mounted on this bracket is a substantially U-shaped support 18 comprising laterally spaced parallel vertical side plates 19 connected by a transverse cross bar 20 at their rear ends, this cross bar comprising an upright bar portion 21 and a horizontal top flange 22 resting on the top of the transverse member 16 of the bracket 12 and secured thereto by the pivot bolt 23. There is also a lug 19a (FIGS. 3 and 4) welded to the lower edge of each plate 19 and extending under the lower edge of the upright flange of the adjacent side angle member 15 of the tractor frame. These lugs cooperate with the bolt 23 and screws 24 to hold the support 18 in proper position on the tractor frame. The support 18 is adapted for limited lateral swinging movement about this bolt in a horizontal plane or about an upright axis, there being sufficient clearance between the side plates or arms 19 and the side angle members 15 of the tractor frame to permit this, and this swinging movement may be controlled by two adjusting screws 24 passing through the upright bar portion 20 and engaging the rear edge of the bracket 12. This permits proper aligning of the cultivator unit with respect to the tractor and proper aligning parallel to the tractor center line.

The linkage also includes a substantially U-shaped frame 25 including laterally spaced side arms 26 and a connecting cross bar 27 at the rear ends of the side arms. At their forward ends these side arms 26 are pivotally connected to the side plates 19 of the support 18 by suitable pivot bolts 28. The connecting cross bar 27 comprises an angularly shaped cross member to which the housing 9 is secured by screws 29. There is also a rearward extension 30 welded at its front end to the cross member 27 to which the housing is also connected by the screws 31. The cross member 27 is strengthened by tapered horizontal flanges 32 welded to the cross member and the side arms 26. There is also an inclined bracing extension 33 on one of the side arms 26 welded to the member 30 to brace and strengthen this member.

The frame 25 carrying the housing 9 may be shifted up and down about the pivotal connections 28, the support 18 and bracket 12 providing means whereby by the arms 26 of the frame 25 are pivotally connected with the tractor frame to mount this unit frame 25 and the housing 9 with the cultivator blades on the tractor. For this purpose there are two lever arms 34 located one under each of the arms 26 of the frame 25 and pivoted to the plates 19 of the support 18 by the pivot pins 35. These arms are provided with laterally extending bosses 36 to lengthen the bearing on the pins. They are also connected to the arms 26 of the frame 25 by links 49. At their rear free ends these lever arms 34 are connected by a cross bolt 37. This bolt is also connected to the lower end of a link 38 pivoted at its upper end at 39 to one arm of a bell crank lever 40 pivoted to part of the frame of the tractor at 41, this tractor frame including the pair of laterally spaced upright members 42. The other arm 43 of this lever is pivotally connected at 44 to a connecting bar or link 45 connected to a control hand lever 46 at 47 pivotally mounted on the frame of the tractor, and its position controlled by a suitable pawl and ratchet 48. By this lever the cultivator may be raised or lowered as the lever arms 34 are connected to the side arms 26 of the frame 25 by the links 49 pivotally connected at their opposite ends 50 and 51 to the levers 34 and the side arms 26 respectively.

At the lower free end of the housing 9 is mounted a transverse shaft 52 on which is mounted the cultivator element 11 comprising blades or tines 53, 54, and 55, 56. These may be of any suitable type but the type shown is preferred, comprising a flat body portion 57, with a laterally extending curved portion 58 extending at an angle to the body portion 57 and curved to correspond with the convexly curved outer edge of the body portion 57, as shown in FIG. 3. They are mounted on the shaft by being bolted, as indicated at 59, to a flat flange 60.

The shaft 52 and the blades are driven from the take-off power pulley 8 on the motor by means of a V-belt 68 running to a grooved pulley 69 mounted on a shaft 70 mounted on the frame of the tractor, and this pulley drives a sprocket 71 operating through a chain 72 to another sprocket 73 on a shaft 74 running in suitable anti-friction bearings in the housing 9. Splined to this shaft for longitudinal sliding movement thereon, but secured so as to be rotated with the shaft, is a spur pinion 76 (FIG. 3) provided with a collar 77 at one side grooved at 78 to receive the forked end of a shift lever 79. It may be slid longitudinally on the shaft to and from mesh wtih a spur gear 80, the gear 80 being mounted on a transverse shaft 81 running in suitable antifriction bearings in the housing 9, and on this shaft is a sprocket 83 connected by a chain drive 84 with a sprocket 85 on the shaft 52 carrying the cultivator blades. Thus these blades are driven from the power take-off 8 on the motor. The pulley 69 is of larger diameter than the pulley 8, the sprocket 71 is of smaller diameter than the sprocket 73, the spur pinion 76 is of smaller diameter than the spur gear 80, and the sprocket 83 is of smaller diameter than the sprocket 85. This drive connection from the motor to the cultivator blades is thus a reducing drive so that the motor may be operated at its normal speed and the speed of the cultivator blades reduced to their normal and most effective speed.

The control lever 79 is pivoted to the top of the housing 9 at 86, by a suitable pivot pin, and on the outside of the housing this pin is connected to an operating lever 87 in turn conected to an operating or control rod 88 provided with a hand grip 89 adjacent the driver's seat whereby driving connection to the cultivator blades may be connected or disconnected as desired. The rod 88 passes through an opening in the upper end of a flat guide bar 88a secured to the housing 9 by suitable bolts 88b. The tension of the drive chain 72 may be controlled and maintained at the proper tightness by means of an idler sprocket 90 mounted on a supporting arm 91 pivoted by means of a stud 92 projecting laterally from a lug 93 welded to the cultivator side plate 19. A suitable coil spring 94 tends to raise this sprocket against the under run of the chain 72 to maintain the proper tension on this chain. A similar idler sprocket may be provided for the upper run of the chain if found necessary or desirable.

The housing 9 is open on one side and closed by the plates 95 and 96 secured by suitable screws 97. This seals the compartment or chamber within the housing so that it may be filled with grease or suitable oil for the parts within the housing to run in a continuous grease or oil bath. The enclosed housing also protects the driving means for the blades from the soil stirred or loosend up by these blades.

The housing 9, as shown in FIG. 3, is preferably mounted somewhat to one side of the longitudinal center line of the frame 25 and therefore the center line of the tractor, so that the operating blades are located laterally offset somewhat from the center line of the tractor and the cultivating action is done slightly off center from the center of the tractor, so that one wheel of the tractor is always running on solid ground.

From the above it will be seen that it will be a simple operation to attach this cultivator unit to the tractor for use and operation thereby, and lining it up properly with the tractor for more effective operation; also that it may be as readily removed from the tractor when it is desired to use the tractor for other operations; further, it will be seen that the unit, and particularly the cultivator tines or blades, may be readily raised to an inoperative position for transfer from one location to another, and may be readily lowered to the operating position; also the depth of the cultivating action may be controlled by the control lever 46. The tines or blades are detachably secured to the plates by which they are mounted on their shaft so they may be readily replaced. The tines or cultivator blades may be guarded and protected by means of a suitable guard 98 secured to the housing 9 and located over these blades. It is preferably concavely-convexly curved to a most effective guarding position, as shown in FIG. 1. Suitable guards (not shown) may also be provided for the drive belt and pulleys as well as the sprockets and chain drive 72.

Having thus set forth the nature of my invention, I claim:

1. In combination a wheeled tractor including: a tractor frame; a supporting bracket; means rigidly mounting the bracket on the tractor frame; a U-shaped support including spaced vertical side plates and a transverse connecting bar between them; a bolt pivotally connecting the support to the bracket so as to permit the support to swing slightly about an upright axis; adjustable means for securing said support to the bracket in any position to which it is swung; a soil-working unit frame that is U-shaped and includes laterally spaced side arms pivotally connected to the side plates of the support to swing in an upright plane; a pair of levers pivoted to the side plates of the support and connected by a transverse cross member at their free ends; a link pivotally connecting each of said levers to a side arm of the unit frame; an operating lever pivoted to the tractor frame; a link connection from the operating lever to the cross member between the first levers arranged to translate movement of the operating lever into raising and lowering of said cross member for swinging the unit frame up and down; and a soil-working unit mounted on the unit frame.

2. The combination of claim 1 in which said adjustable means comprises adjusting screws on the support spaced laterally from the bolt connecting this support to the bracket and engaging the bracket at their free ends whereby the support and elements carried thereby may be swung about said bolt as a pivot to line up the unit with the tractor and secured in the position to which it is swung by said adjusting screws.

3. In combination: a wheeled tractor including a frame on which is mounted a motor; said frame including laterally spaced angle bars having horizontal flanges; a supporting bracket having spaced side members rigidly secured to said flanges and a transverse member connecting said side members; a substantially U-shaped support including spaced vertical side plates and a transverse connecting member pivotally connected to the transverse member of the bracket by a single upright bolt; a substantially U-shaped soil-working unit frame including spaced side arms pivotally connected at their free ends to the side plates of the support; a pair of levers pivotally mounted on the side plates of the support; links connecting said levers to the arms of the unit frame; an operating lever; means connecting the operating lever to the free ends of the first levers to swing the unit frame up and down; a housing carried by the unit frame and projecting rearwardly therefrom; soil-working blades carried by the free end of the housing; driving means for the blades supported and wholly disposed in the housing; and a driving connection from the motor to the blade driving means in the housing.

4. The combination of claim 3 in which there are adjusting screws in the connecting member of the support located on opposite sides of and spaced from the upright bolt; and the free ends of the adjusting screws engage the transverse member of the bracket, whereby the support and the unit frame may be adjusted about the upright bolt as a pivot to position the unit with respect to the tractor.

5. In combination: a wheeled tractor including a frame; a supporting bracket; securing means mounting the bracket rigidly on the frame; and a soil-working attachment unit comprising a support including vertical spaced side plates and a transverse connecting bar between them; a bolt pivotally connecting the support to the bracket to swing about an upright axis; a unit frame including laterally spaced side arms pivotally connected to the plates of the support to swing in an upright plane; a pair of levers pivoted to the plates of the support and connected by a transverse cross member at their free ends; a link pivotally connecting each of said levers to a side arm of the unit frame; an operating lever pivoted to the tractor frame; a link connection from the operating lever to the cross member between the first levers for swinging the unit frame up and down; and a soil-working means mounted on the unit frame.

6. In combination: a wheeled tractor including a frame; said frame including laterally spaced angle bars having horizontal flanges; a supporting bracket having spaced side members secured to said flanges and a transverse member connecting said side members; and a soil-working unit comprising a substantially U-shaped support including spaced vertical side plates and a transverse connecting member pivotally connected to the transverse member of the bracket by a single upright bolt; a substantially U-shaped frame including spaced side arms pivotally connected at their free ends to the side plates of the support; a pair of levers pivotally mounted on the side plates of the support; links connecting said levers to the arms of the unit frame; an operating lever; means connecting the operating lever to the free ends of the first levers to swing the unit frame up and down; and a soil-working means carried by the unit frame.

References Cited in the file of this patent

UNITED STATES PATENTS

| | | |
|---|---|---|
| 503,006 | Sexson | Aug. 8, 1893 |
| 868,593 | Blevins et al. | Oct. 15, 1907 |
| 1,219,880 | Strode | Mar. 20, 1917 |
| 1,387,725 | Johnson | Aug. 16, 1921 |
| 1,523,072 | Ingersoll | Jan. 13, 1925 |
| 1,574,654 | Howard | Feb. 23, 1926 |
| 2,012,434 | Pedersen | Aug. 27, 1935 |
| 2,229,290 | Gosser | Jan. 21, 1941 |
| 2,597,107 | Kelsey | May 20, 1952 |
| 2,796,819 | Johnson | June 25, 1957 |

FOREIGN PATENTS

| | | |
|---|---|---|
| 470,640 | Canada | Jan. 9, 1951 |
| 886,693 | France | Oct. 9, 1942 |
| 1,108,922 | France | Oct. 4, 1954 |
| 705,868 | Great Britain | Mar. 17, 1954 |

OTHER REFERENCES

Plugfabrik (German printed application), P14454 (K145a Gr2402), published Aug. 9, 1956.